United States Patent
Fu et al.

(10) Patent No.: US 9,804,968 B2
(45) Date of Patent: Oct. 31, 2017

(54) STORAGE SYSTEM AND DATA WRITING METHOD

(71) Applicant: Acer Incorporated, New Taipei (TW)

(72) Inventors: Tz-Yu Fu, New Taipei (TW); Po-Wei Wu, New Taipei (TW); Hsin-Yu Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 307 days.

(21) Appl. No.: 14/656,947

(22) Filed: Mar. 13, 2015

(65) Prior Publication Data

US 2015/0356011 A1 Dec. 10, 2015

(30) Foreign Application Priority Data

Jun. 5, 2014 (TW) .............................. 103119504 A

(51) Int. Cl.
*G06F 12/08* (2016.01)
*G06F 12/0895* (2016.01)

(52) U.S. Cl.
CPC .. *G06F 12/0895* (2013.01); *G06F 2212/1021* (2013.01); *G06F 2212/225* (2013.01)

(58) Field of Classification Search
None
See application file for complete search history.

(56) References Cited

U.S. PATENT DOCUMENTS

| | | | |
|---|---|---|---|
| 7,769,952 B2 * | 8/2010 | Hashimoto | G06F 12/084 711/113 |
| 8,281,076 B2 * | 10/2012 | Hashimoto | G06F 12/084 711/129 |
| 8,612,721 B2 | 12/2013 | Asano et al. | |
| 8,612,956 B2 * | 12/2013 | Maier | G06F 12/0253 717/158 |
| 8,782,319 B2 | 7/2014 | Wang et al. | |
| 8,886,884 B2 | 11/2014 | Chiu et al. | |

(Continued)

FOREIGN PATENT DOCUMENTS

| TW | 201135465 | 10/2011 |
|---|---|---|
| TW | 201214117 | 4/2012 |

(Continued)

OTHER PUBLICATIONS

Webopedia, "Ram Disk", Aug. 8, 2002, pp. 1-2, https://web.archive.org/web/20020808071514/http://www.webopedia.com/TERM/R/RAM_disk.html.*

(Continued)

*Primary Examiner* — Christopher D Birkhimer
(74) *Attorney, Agent, or Firm* — McClure, Qualey & Rodack, LLP

(57) ABSTRACT

An electronic device includes a first storage unit, a second storage unit and a control unit. The first storage unit stores the cache of the data. The second storage unit stores the data. The control unit calculates a first ratio of the cache corresponding to the data according to the capacity of the first storage unit. The control unit sends a distribution signal to the processing unit when the control unit reads the data from the second storage unit. The processing unit obtains a first distribution result corresponding to the cache according to the first ratio, and stores the cache to the first storage unit according to the first distribution result.

24 Claims, 4 Drawing Sheets

(56) References Cited

U.S. PATENT DOCUMENTS

| | | | | |
|---|---|---|---|---|
| 2005/0071551 A1* | 3/2005 | Miyamoto | ......... | G06F 12/0871 |
| | | | | 711/113 |
| 2006/0215682 A1* | 9/2006 | Chikusa | ............... | H04L 69/329 |
| | | | | 370/428 |
| 2007/0033341 A1* | 2/2007 | Hashimoto | ........... | G06F 12/084 |
| | | | | 711/113 |
| 2009/0077306 A1 | 3/2009 | Arcedera et al. | | |
| 2009/0083476 A1 | 3/2009 | Pua et al. | | |
| 2009/0150875 A1* | 6/2009 | Maier | ................. | G06F 12/0253 |
| | | | | 717/158 |
| 2010/0274964 A1* | 10/2010 | Hashimoto | ........... | G06F 12/084 |
| | | | | 711/113 |
| 2012/0317339 A1* | 12/2012 | Gissel | ................ | G06F 12/0871 |
| | | | | 711/103 |
| 2014/0006687 A1* | 1/2014 | Huang | ................ | G06F 12/0246 |
| | | | | 711/103 |
| 2014/0019677 A1* | 1/2014 | Chang | ................ | G06F 12/0804 |
| | | | | 711/105 |
| 2014/0019688 A1* | 1/2014 | Ghodsnia | ........... | G06F 12/0866 |
| | | | | 711/135 |
| 2014/0025921 A1 | 1/2014 | Yuan et al. | | |

FOREIGN PATENT DOCUMENTS

| | | |
|---|---|---|
| TW | 201310237 | 3/2013 |
| TW | 201312352 | 3/2013 |
| TW | 201405311 | 2/2014 |

OTHER PUBLICATIONS

Chinese language office action dated Nov. 2, 2015, issued in application No. TW 103119504.

* cited by examiner

STORAGE SYSTEM AND DATA WRITING METHOD

CROSS REFERENCE TO RELATED APPLICATIONS

This Application claims priority of Taiwan Patent Application No. 103119504, filed on Jun. 5, 2014, the entirety of which is incorporated by reference herein.

BACKGROUND OF THE INVENTION

Field of the Invention

The application relates in general to an electronic device and a data writing method, and in particular to an electronic device and a data writing method using RAMDisk and a hybrid hinting program to increase the speed of the data reading.

Description of the Related Art

These days, due to the rapid development of technology, users always use their electronic device to implement a plurality of functions. For pursuing better performance, the requirements for electronic devices have become increasingly high. The speed of accessing data in the storage unit is one of the main factors affecting the performance of an electronic device. The traditional Hard Disk Drive stores and retrieves digital information from the disk by using the magnetic head to change the magnetization on the disk. The advantages of the Hard Disk Drive are that it has high capacity and is cheap. Compared to the Hard Disk Drive, the advantages of a Solid State Disk are that it has low power consumption, no noise, and is shockproof. But the disadvantages are that it is expensive and its write count is limited. RAMDisk uses software to simulate a hard disk. Compared to the Hard Disk Drive, the advantage of the RAMDisk is that the speed of accessing data is faster, but the disadvantage is that the data will be lost in the event of power loss. Thus, how to improve the speed of accessing data by using the Hard Disk Drive, the Solid State Disk and the RAMDisk is a problem which needs to be solved immediately.

BRIEF SUMMARY OF INVENTION

An embodiment of the invention provides an electronic device that includes a first storage unit, a second storage unit and a control unit. The first storage unit serves as a cache for data. The second storage unit stores the data. The control unit calculates a first ratio for the cache corresponding to the data according to the capacity of the first storage unit. The control unit sends a distribution signal to the processing unit when the control unit reads the data from the second storage unit. The processing unit obtains a first distribution result corresponding to the cache according to the first ratio, and stores the cache in the first storage unit according to the first distribution result.

Another embodiment of the invention provides an electronic device that includes a first storage unit, a second storage unit and a control unit. The first storage unit stores a part of the cache of the data. The second storage unit stores the data and another part of the cache of the data. The control unit calculates a predetermined ratio of the cache corresponding to the data according to the capacity of the first storage unit and the second storage unit. The control unit further obtains a weighting of a cache fragment according to the predetermined ratio, and stores the cache fragment to the first storage unit or the second storage unit according to the weighting.

Another embodiment of the invention provides a data writing method adapted to an electronic device, wherein the electronic device comprises a first storage unit and a second storage unit. The first storage unit stores the cache of the data and the second storage unit stores the data. The steps comprise: reading the data of the second storage unit; calculating a first ratio of the cache corresponding to the data according to the capacity of the first storage unit; obtaining the first distribution result corresponding to the cache according to the first ratio; and storing the cache to the first storage unit according to the first distribution result.

Another embodiment of the invention provides a data writing method adapted to an electronic device, wherein the electronic device comprises a first storage unit and a second storage unit. The first storage unit stores a part of the cache of the data and the second storage unit stores the data and another part of the cache of the data. The steps comprise: reading the data of the second storage unit; calculating a predetermined ratio of the cache corresponding to the data according to the capacity of the first storage unit and the second storage unit; obtaining the distribution result of the data according to the predetermined ratio; obtaining weightings of cache fragments according to the distribution result; and storing the cache to the first storage unit and the second storage unit respectively according to the weightings.

Another embodiment of the invention provides a data writing method adapted to an electronic device, the steps comprising: reading data; obtaining first information of a first storage unit and second information of a second storage unit; obtaining weightings of cache fragments of the data; calculating a predetermined ratio of the cache corresponding to the data according to the first information and the second information; and determining cache volumes distributed to the first storage unit and the second storage unit according to the predetermined ratio and weightings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas of applicability of the present devices and methods will become apparent from the detailed description provided hereinafter. It should be understood that the detailed description and specific examples, while indicating exemplary embodiments of the electronic devices and the data writing methods, are intended for purposes of illustration only and are not intended to limit the scope of the invention.

Figure 1:
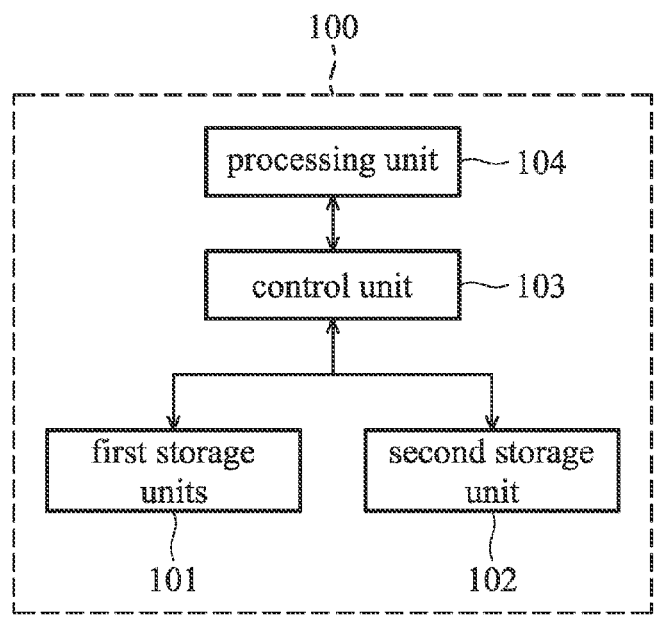
FIG. 1 is a block diagram of an electronic device in accordance with an embodiment of the invention.

FIG. 1 is a block diagram of an electronic device in accordance with an embodiment of the invention. As shown in FIG. 1, the electronic device 100 includes a first storage unit 101, a second storage unit 102, a control unit 103 and a processing unit 104. The first storage unit 101 stores the cache of the data. The second storage unit 102 stores the data. The control unit 103 calculates a first ratio of the cache corresponding to the data according to the capacity of the first storage unit. The processing unit 104 implements the instruction and processes the data of the software.

According to an embodiment of the invention, the first storage unit 101 is a RAMDisk, and the second storage unit 102 is an HDD (Hard Disk Drive). When the data from the second storage unit 102 (i.e. HDD) is read by the processing unit 104, the control unit 103 must rewrite the information of the hard disk to enable the Hybrid Hinting program before the information is received by the processing unit 104. The control unit 103 will send a distribution signal to the processing unit 104 for enabling the Hybrid Hinting program according to a first ratio obtained by the capacity of the first storage unit 101 (i.e. RAMDisk) and the capacity of the second storage unit 102 (i.e. HDD) due to the condition for enabling the Hybrid Hinting program being that the hard disk must be an SSHD (Solid State Hybrid Drive). The first ratio is the ratio of the capacity of the first storage unit 101 and the capacity of the second storage unit 102. The distribution signal is used to declare that the first storage unit 101 and the second storage unit 102 are an SSHD. The processing unit 104 will enable the Hybrid Hinting program after receiving the distribution signal, and the capacity of the SSD (Solid State Drive) of the SSHD is the capacity of the first storage unit 101.

When the processing unit 104 receives the distribution signal, the Hybrid Hinting program is enabled and the data is distributed according to the weightings. The weightings of the data is obtained by the operating system implemented by the processing unit 104 or a service on the Internet according to the access frequency of the data and the cache volume of the hard disk. In other words, the processing unit 104 sets the weightings of the data according to the first ratio after receiving the distribution signal. For example, the data will be set as the highest priority (i.e. Priority 0) when its access frequency is higher than the predetermined access frequency. After that, the priority of the data will set as Priority 1 to Priority 7 according to the access frequency and the cache volume in sequence. In the embodiment, the processing unit 104 stores Priority 0 to Priority 1 data as cache.

When the processing unit 104 finishes the data configuration, the cache is stored to the first storage unit 101 by the control unit 103. Due to the second storage unit 102 identified as an SSHD by the processing unit 104, the control unit 103 will intercept and rewrite the instruction before the second storage unit 102 receives the instruction from the processing unit 104 for correctly storing the cache to the first storage unit 101.

In addition, the data stored in the RAMDisk will be lost after rebooting due to the RAMDisk being a volatile storage medium. The control unit 103 further stores the information of the cache corresponding to the RAMDisk, likes the LBA (Logical Block Address) of the data or the file size, and sends the information back to the processing unit 104 after rebooting. The cache will copy data to the RAMDisk from the second storage unit 102 (i.e. HDD) for implementing the read operation by the processing unit 104.

According to another embodiment, the first storage unit 101 is a RAMDisk, and the second storage unit is a SSHD. When the processing unit 104 reads the data from the second storage unit 102 (i.e. SSHD), the information of the second storage unit 102 is sent to the control unit 103 for rewriting.

Then the control unit 103 obtains a predetermined ratio according to the capacity of the first storage unit 101 and the capacity of the second storage unit 102, and sends a distribution signal with the predetermined ratio to the processing unit 104. The predetermined ratio is the ratio of the capacity of the SSD of the first storage unit 101 and the second storage unit 102 and the capacity of the HDD of the second storage unit 102. In the rewrite information, the capacity for storing the cache is the sum of the capacity of the SSD of the first storage unit 101 and the second storage unit 102. When the processing unit 104 receives the distribution signal with rewrite information, the Hybrid Hinting program is enabled and the data is distributed according to the weightings.

In the embodiment, when the processing unit 104 distributes the cache according to the sum of the capacity of the SSD of the first storage unit 101 and the second storage unit 102, the processing unit 104 only determines that the data is distributed to the HDD or the disk for storing the cache, but can not determine that the cache is distributed to the RAMDisk or the SSD of the second storage unit 102. Therefore, when the control unit 103 receives the storage information of the cache, the storage location of the cache is determined according to the weightings. For example, the control unit 103 stores the cache with Priority 1 to the RAMDisk and the cache with Priority 0, 2-7 to the SSD for extending the life of the SSD due to the write count of each gate of the memory of the SSD being limited and the cache with Priority 1 always being flash.

In addition, the control unit 103 further stores the storage information of the cache corresponding to the RAMDisk which likes the LBA location of the data or the file size, and sends the information back to the processing unit 104 after rebooting. The cache will copy to the RAMDisk from the second storage unit 102 (i.e. HDD) for implementing the reading operation by the processing unit 104.

It should be noted that if the control unit 103 does not rewrite the information of the second storage unit 102 sent to the processing unit 104, the first storage unit 101 will be deemed by the processing unit 104 to be general storage rather than a storage unit for storing the cache unit. Therefore, rewriting the information sent back to the processing unit 104 by the control unit 103 can increase the capacity for storing the cache, the percentage of the cache, and the speed of data processing of the processing unit 104.

Figure 2:
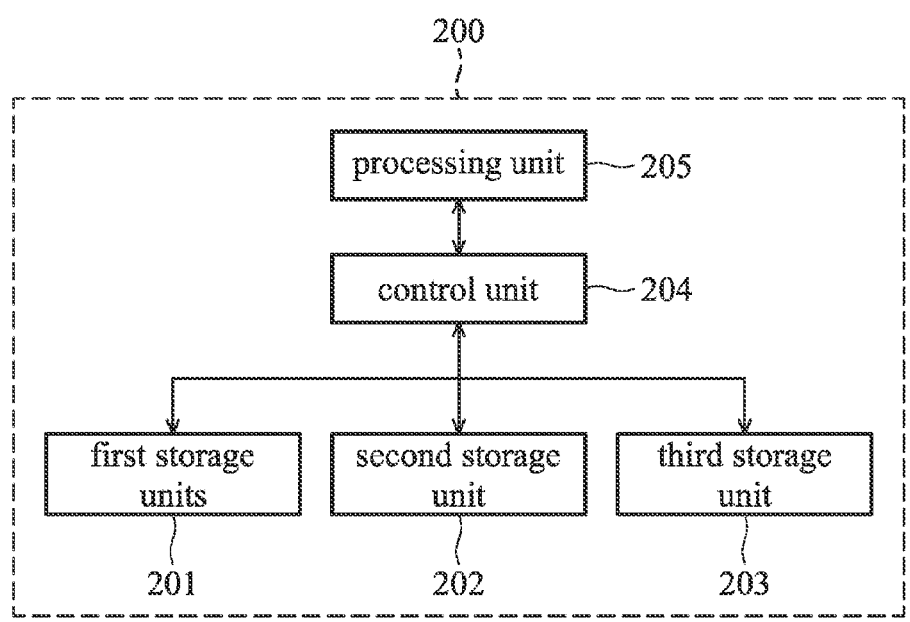
FIG. 2 is a block diagram of an electronic device in accordance with another embodiment of the invention.

Please refer to FIG. 2. FIG. 2 is a block diagram of an electronic device in accordance with another embodiment of the invention. As shown in FIG. 2, the electronic device 200 includes a first storage unit 201, a second storage unit 202, a third storage unit 203, a control unit 204 and a processing unit 205. The first storage unit 201 stores a part of the cache of the data. The second storage unit 202 stores the data. The third storage unit 203 stores another part of the cache of the data. The control unit 204 calculates a second ratio of the cache corresponding to the data according to the capacity of the first storage unit and the third storage unit. The processing unit 205 implements the instruction and processes the data of the software.

According to an embodiment of the invention, the first storage unit 201 is a RAMDisk, the second storage unit 202 is an HDD and the third storage unit 203 is a SSHD. When the data from the second storage unit 202 (i.e. HDD) is read by the processing unit 205, the control unit 204 must rewrite the information of the hard disk for enabling the Hybrid Hinting program before the information is received by the processing unit 205. After receiving the information of the second storage unit 202, the control unit 204 will send a distribution signal to the processing unit 104 for enabling the Hybrid Hinting program according to a second ratio obtained by the capacity of the first storage unit 201 (i.e. RAMDisk), the capacity of the second storage unit 202 (i.e. HDD) and the capacity of the third storage unit 203 (i.e. SSD). The second ratio is the ratio of the capacity of the first storage unit 201, the capacity of the second storage unit 202 and the capacity of the third storage unit 203, and also the ratio of the capacity of the cache and the capacity of the HDD. The distribution signal is used to declare that the first storage unit 201, the second storage unit 202 and the third storage unit 203 are a SSHD. The processing unit 205 will enable the Hybrid Hinting program after receiving the distribution signal, and the capacity of the SSD of the SSHD is the sum of the capacity of the first storage unit 201 and the third storage unit 203. It should be noted that the processing unit 205 can only obtain the ratio of the capacity of the cache and the capacity of the HDD according to the distribution signal, but can not obtain the real ratio of the capacity of the first storage unit 201 and the capacity of the third storage unit 203.

When the processing unit 205 distributes the cache according to the capacity of the cache and the capacity of the second storage unit 202, the processing unit 205 only determines that the data is distributed to the HDD or the disk for storing the cache, but can not determine that the cache is distributed to the first storage unit 201 (i.e. RAMDisk) or the third storage unit 203 (i.e. SSD). Therefore, when the control unit 204 receives the storing-information of the cache, the storage location of the cache is determined according to the weightings. For example, the control unit 204 stores the cache with Priority 1 to the RAMDisk and the cache with Priority 0, 2-7 to the SSD for extending the life of the SSD due to the write count of each gate of the memory of the SSD being limited and the cache with Priority 1 always being flash.

In addition, the control unit 204 further stores the information of the cache corresponding to the RAMDisk which likes the LBA location of the data or the file size, and sends the information back to the processing unit 104 after rebooting. The cache will copy to the RAMDisk from the second storage unit 102 (i.e. HDD) for implementing the reading operation by the processing unit 104.

Figure 3:
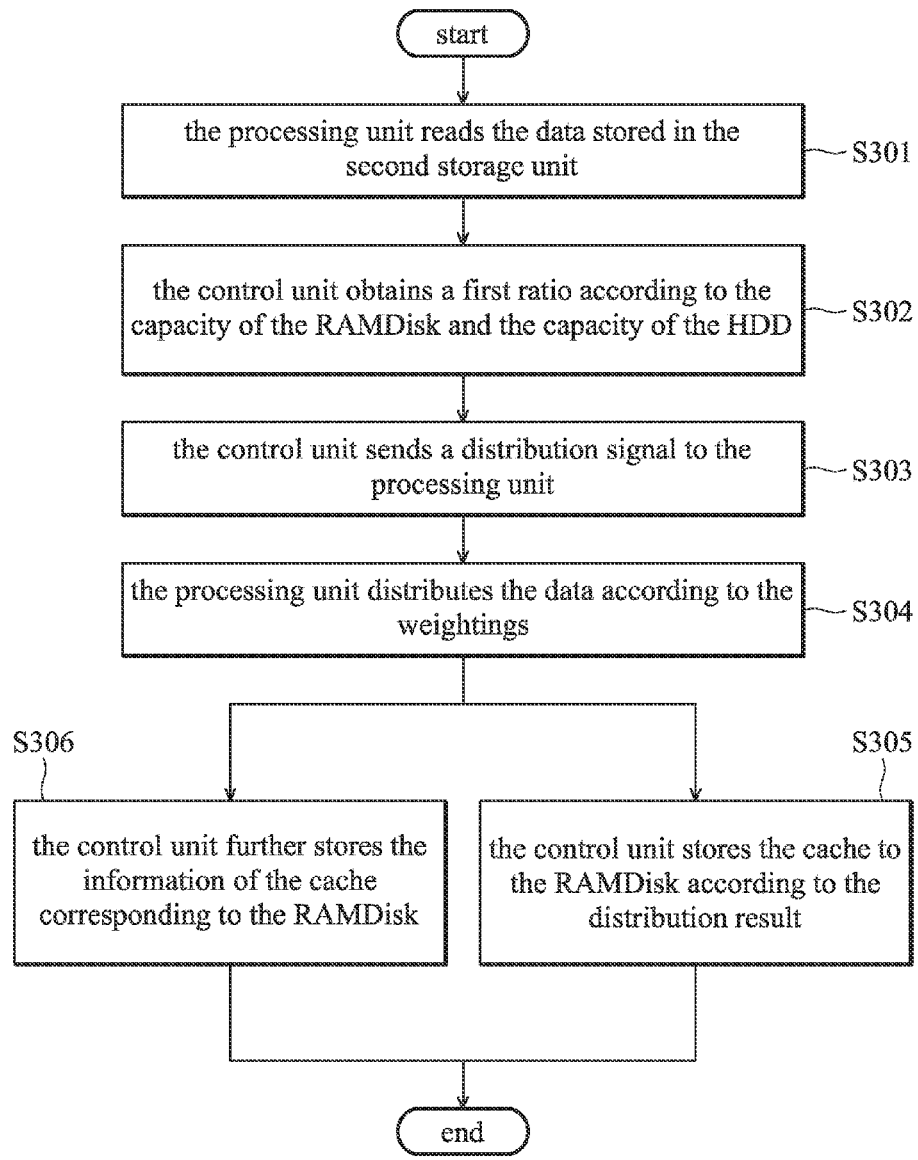
FIG. 3 is a flow chart of a data writing method in accordance with an embodiment of the invention.

Please refer to FIG. 1 with FIG. 3. FIG. 3 is a flow chart of a data writing method in accordance with an embodiment of the invention. According to an embodiment of the invention, the data writing method is adapted to the electronic device 100 as shown in FIG. 1. The electronic device 100 includes a first storage unit 101, a second storage unit 102, a control unit 103 and a processing unit 104. The first storage unit 101 stores the cache of the data. The second storage unit 102 stores the data. The control unit 103 calculates a first ratio of the cache corresponding to the data according to the capacity of the first storage unit. The processing unit 104 implements the instruction and processes the data of the software.

In step S301, the processing unit 104 reads the data stored in the second storage unit 102. In step S302, the control unit 103 rewrites the information of the hard disk for enabling Hybrid Hinting program before the information is received by the processing unit 104. The control unit 103 obtains a first ratio according to the capacity of the first storage unit 101 and the capacity of the second storage unit 102. The first ratio is the ratio of the capacity of the first storage unit 101 and the capacity of the second storage unit 102. In step S303, the control unit 103 sends a distribution signal to the processing unit 104 for enabling the Hybrid Hinting program according to the first ratio. The distribution signal is used to declare that the first storage unit 101 and the second storage unit 102 are a SSHD due to the condition for enabling the Hybrid Hinting program is that the hard disk must be the SSHD. In step S304, the processing unit 104 enables the Hybrid Hinting program after receiving the distribution signal, and the capacity of the SSD (Solid State Drive) of the SSHD is the capacity of the first storage unit 101. The data is distributed according to the weightings. The weightings of the data is obtained by the operating system implemented by the processing unit 104 or the service of Internet according to the access frequency of the data and the cache volume of the hard disk. In other words, the processing unit 104 sets the weightings of the data according to the first ratio after receiving the distribution signal. For example, the data will be set as the highest priority (i.e. Priority 0) when its access frequency is higher than the predetermined access frequency, after that the priority of the data will set as Priority 1 to Priority 7 according to the access frequency and the cache volume in sequence. In the embodiment, the processing unit 104 stores the data which has Priority 0 to Priority 1 as the cache.

In step S305, when the processing unit 104 finishes the data configuration, the cache is stored to the first storage unit 101 by the control unit 103. Due to the second storage unit 102 is identified as a SSHD by the processing unit 104, the control unit 103 will intercept and rewrite the instruction before the second storage unit 102 receives the instruction from the processing unit 104 for correctly storing the cache to the first storage unit 101.

In addition, in step S306, the data stored in the RAMDisk will be lost after rebooting due to the RAMDisk being a volatile storage medium. The control unit 103 further stores the information of the cache corresponding to the RAMDisk which likes the LBA location of the data or the file size, and sends the information back to the processing unit 104 after rebooting. The cache will copy to the RAMDisk from the second storage unit 102 (i.e. HDD) for implementing the reading operation by the processing unit 104.

Figure 4:
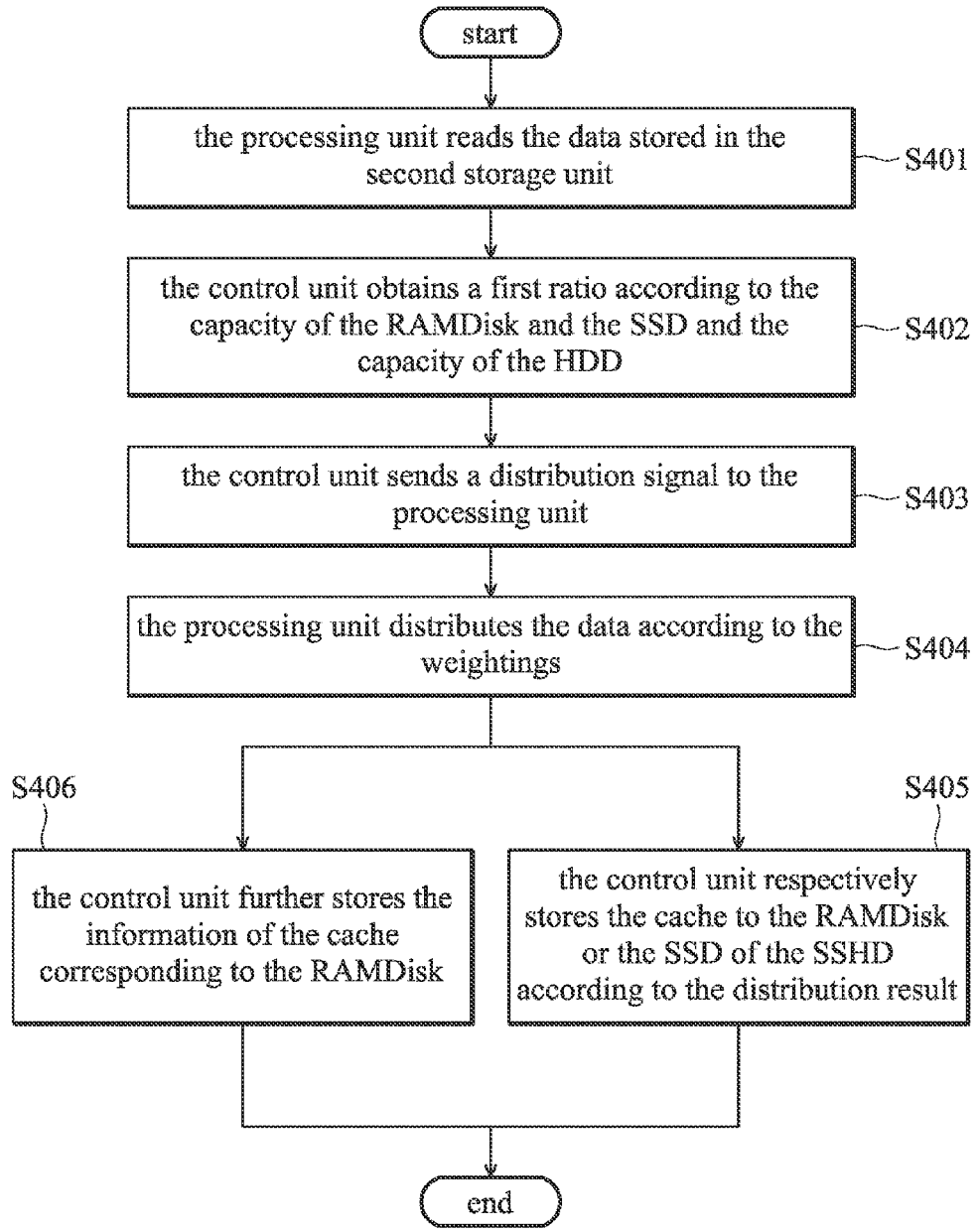
FIG. 4 is a flow chart of a data writing method in accordance with another embodiment of the invention.

Please refer to FIG. 1 with FIG. 4. FIG. 4 is a flow chart of a data writing method in accordance with another embodiment of the invention. According to an embodiment of the invention, the data writing method is adapted to the electronic device 100 as shown in FIG. 1. The electronic device 100 includes a first storage unit 101, a second storage unit 102, a control unit 103 and a processing unit 104. The first storage unit 101 stores the cache of the data. The second storage unit 102 stores the data. The control unit 103 calculates a first ratio of the cache corresponding to the data according to the capacity of the first storage unit. The processing unit 104 implements the instruction and processes the data of the software. The first storage unit 101 is a RAMDisk, and the second storage unit 102 is a SSHD.

In step S401, the processing unit 104 reads the data stored in the second storage unit 102. In step 402, the control unit 103 rewrites the information of the hard disk for enabling Hybrid Hinting program before the information is received by the processing unit 104. The control unit 103 obtains a predetermined ratio according to the capacity of the first storage unit 101 and the capacity of the second storage unit 102. The predetermined ratio is the ratio of the capacity of the first storage unit 101 and the SSD of the second storage unit 102 and the capacity of the HDD of the second storage unit 102. In the rewriting-information, the capacity for storing the cache is the sum of the capacity of the SSD of the first storage unit 101 and the second storage unit 102. In step S403, the control unit 103 sends a distribution signal to the processing unit 104 for enabling the Hybrid Hinting program according to the predetermined ratio. In step S404, the processing unit 104 enables the Hybrid Hinting program after receiving the distribution signal, distributes the data according to the sum of the capacity of the first storage unit 101, the capacity of the SSD of the second storage unit 102 and the weighting, and obtains a distribution result. The processing unit 104 only determines that the data is distributed to the HDD or the disk for storing the cache, but can not determine that the cache is distributed to the RAMDisk or the SSD of the second storage unit 102. Therefore, in step S405, the control unit 103 respectively stores the cache to the first storage unit 101 or the SSD of the second storage unit 102 according to the distribution result of the processing and the weightings.

In addition, in step S406, the control unit 103 further stores the information of the cache corresponding to the RAMDisk which likes the LBA location of the data or the file size, and sends the information back to the processing unit 104 after rebooting. The cache will copy to the RAMDisk from the second storage unit 102 (i.e. HDD) for implementing the reading operation by the processing unit 104.

Figure 5:
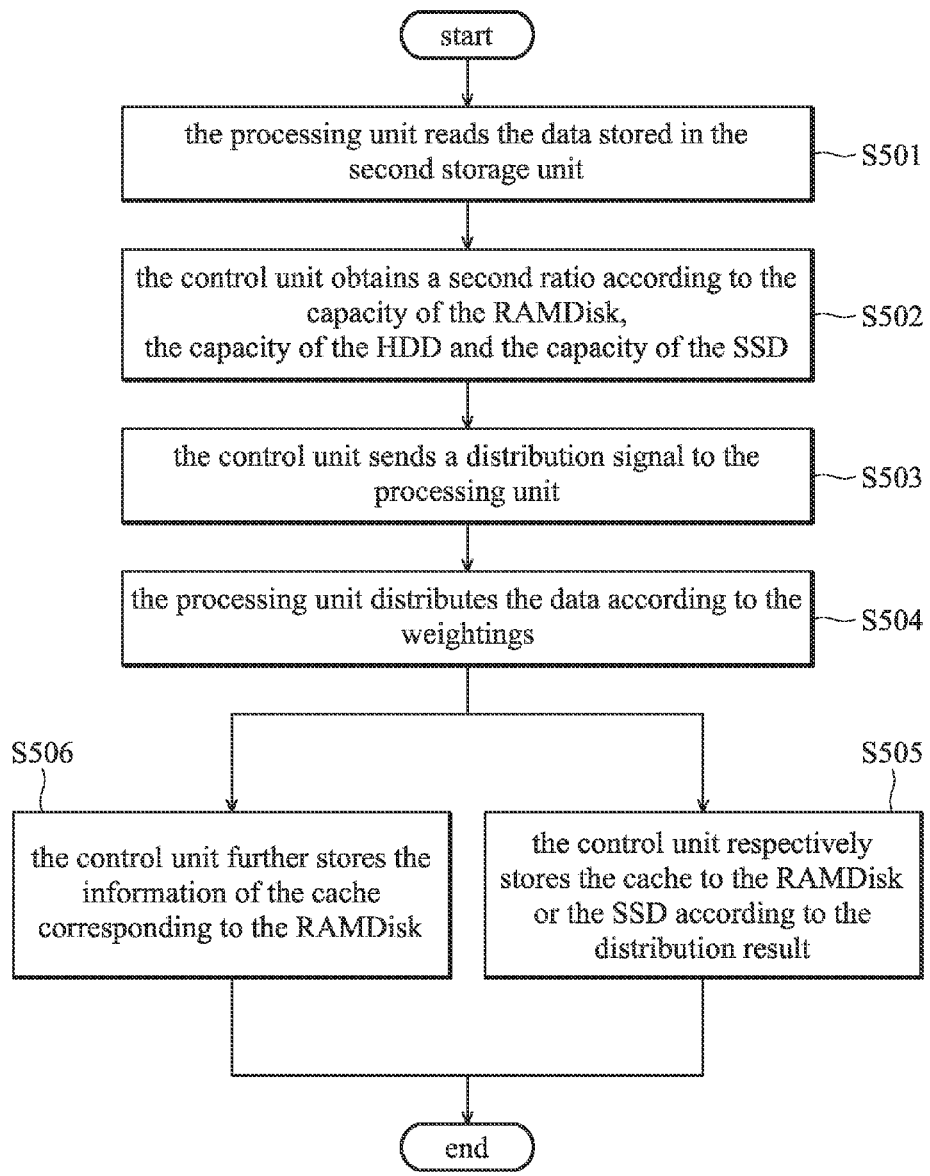
FIG. 5 is a flow chart of a data writing method in accordance with another embodiment of the invention.

Please refer to FIG. 2 with FIG. 5. FIG. 5 is a flow chart of a data writing method in accordance with another embodiment of the invention. According to an embodiment of the invention, the data writing method is adapted to the electronic device 200 as shown in FIG. 2. The electronic device 200 includes a first storage unit 201, a second storage unit 202, a third storage unit 203, a control unit 204 and a processing unit 205. The first storage unit 201 stores a part of the cache of the data. The second storage unit 202 stores the data. The third storage unit 203 stores another part of the cache of the data. The control unit 204 calculates a second ratio of the cache corresponding to the data according to the capacity of the first storage unit and the third storage unit. The processing unit 205 implements the instruction and processes the data of the software. The first storage unit 201 is a RAMDisk, the second storage unit 202 is a HDD, and the third storage unit 203 is a SSD.

In step S501, the processing unit 205 reads the data stored in the second storage unit 202. In step S502, the control unit 204 rewrites the information of the hard disk for enabling Hybrid Hinting program before the information is received by the processing unit 205. After receiving the information of the second storage unit 202, the control unit 204 obtains a second ratio according to the capacity of the first storage unit 201 (i.e. RAMDisk), the capacity of the second storage unit 202 (i.e. HDD) and the capacity of the third storage unit 203 (i.e. SSD). The second ratio is the ratio of the capacity of the first storage unit 201, the capacity of the second storage unit 202 and the capacity of the third storage unit 203, also the ratio of the capacity of the cache and the capacity of the HDD. In step S503, the control unit 204 sends a distribution signal to the processing unit 205 for enabling the Hybrid Hinting program according to the second ratio. The distribution signal is used to declare that the first storage unit 201, the second storage unit 202 and the third storage unit 203 are a SSHD, and the capacity of the SSD of the SSHD is the sum of the capacity of the first storage unit 201 and the third storage unit 203.

In step S504, the processing unit 205 enables the Hybrid Hinting program after receiving the distribution signal, and the cache is distributed according to the capacity of the cache and the capacity of the second storage unit 202. The processing unit 205 only determines that the data is distributed to the HDD or the disk for storing the cache, but can not determine that the cache is distributed to the first storage unit 201 (i.e. RAMDisk) or the third storage unit 203 (i.e. SSD). Therefore, in step S505, the control unit 204 stores the cache to the first storage unit (i.e. RAMDisk) or the third storage unit 203 (i.e. SSD) according to the distribution result of the processing unit 205 and the weightings. For example, the control unit 204 stores the cache with Priority 1 to the RAMDisk and the cache with Priority 0, 2-7 to the SSD for extending the life of the SSD due to the write count of each gate of the memory of the SSD is limited and the cache with Priority 1 is always flash.

In addition, in step S506, the control unit 204 further stores the information of the cache corresponding to the RAMDisk which likes the LBA location of the data or the file size, and sends the information back to the processing unit 205 after rebooting. The cache will copy to the RAMDisk from the second storage unit 202 (i.e. HDD) for implementing the reading operation by the processing unit 205.

As described above, an embodiment of the invention provides an electronic device and a data writing method. The user can increase the capacity for storing the cache by simulating the RAMDisk as a hard disk. Further, when the electronic device includes a SSD, the cache which is usually flash will be stored in the RAMDisk according to the weightings for extending the life of the SSD, and the efficiency of the electronic device can be improved.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An electronic device, comprising:
a first storage unit, storing cache of data;
a second storage unit, storing the data;
a control unit, calculating a first ratio of the cache corresponding to the data according to a capacity of the first storage unit,
wherein the control unit sends a distribution signal to a processing unit when the control unit reads the data from the second storage unit, and the processing unit obtains a first distribution result corresponding to the cache according to the first ratio and stores the cache to the first storage unit according to the first distribution result.

2. The electronic device as claimed in claim 1, wherein the first storage unit is a RAMDisk and the second storage unit is a Hard Disk Drive.

3. The electronic device as claimed in claim 2, wherein the electronic device further comprises a third storage unit, the control unit obtains a second ratio of the cache corresponding to the data according to the capacity of the first storage unit and a capacity of the third storage unit, the processing unit obtains a second distribution result corresponding to the data according to the second ratio and obtains a weighting of a cache fragment according to the second distribution result, and saves the cache to the first storage unit and the second storage unit according to the weighting, wherein the third storage unit is a Solid State Drive.

4. The electronic device as claimed in claim 1, wherein the first storage unit is a RAMDisk.

5. The electronic device as claimed in claim 1, wherein the processing unit obtains the first distribution result corresponding to the cache according to a Hybrid Hinting program and the first ratio.

6. An electronic device, comprising:
a first storage unit, storing a part of cache of data;
a second storage unit, storing the data and another part of the cache of the data; and
a control unit, calculating a predetermined ratio of the cache corresponding to the data according to a capacity of the first storage unit and the second storage unit, the control unit further obtains a weighting of a cache fragment according to a predetermined ratio, and stores the cache fragment to the first storage unit or the second storage unit according to the weighting.

7. The electronic device as claimed in claim 6, wherein the first storage unit is a RAMDisk and the second storage unit is a Solid State Hybrid Drive, the control unit calculates the predetermined ratio of the cache corresponding to the data according to a capacity of the first storage unit and a capacity of a Solid State Drive of the second storage unit.

8. The electronic device as claimed in claim 6, wherein the first storage unit is a RAMDisk.

9. The electronic device as claimed in claim 6, wherein the processing unit obtains the weighting corresponding to the cache according to a Hybrid Hinting program and the predetermined ratio.

10. A data writing method, adapted to an electronic device, wherein the electronic device comprises a first storage unit and a second storage unit, the first storage unit stores cache of data and the second storage unit stores the data, the steps comprising:
reading the data of the second storage unit;
calculating a first ratio of the cache corresponding to the data according to a capacity of the first storage unit;
obtaining a first distribution result corresponding to the cache according to the first ratio; and
storing the cache to the first storage unit according to the first distribution result.

11. The data writing method as claimed in claim 10, wherein the first storage unit is a RAMDisk and the second storage unit is a Hard Disk Drive.

12. The data writing method as claimed in claim 11, wherein the steps further comprise:
obtaining a second ratio of the cache corresponding to the data according to a capacity of the first storage unit and a capacity of a third storage unit of the electronic device;
obtaining a second distribution result according to the second ratio;
obtaining a weighting of a cache fragment according to the second distribution result; and
storing the cache to the first storage unit and the third storage unit according to the weighting,
wherein the third storage unit is a Solid State Drive.

13. The data writing method as claimed in claim 10, wherein the first storage unit is a RAMDisk.

14. The data writing method as claimed in claim 10, wherein the steps further comprise:
obtaining the first distribution result of the cache according to a Hybrid Hinting program and the first ratio.

15. A data writing method, adapted to an electronic device, wherein the electronic device comprises a first storage unit and a second storage unit, the first storage unit stores a part of cache of data and the second storage unit stores the data and another part of the cache of the data, the steps comprising:
reading the data of the second storage unit;
calculating a predetermined ratio of the cache corresponding to the data according to a capacity of the first storage unit and a capacity of the second storage unit;
obtaining a distribution result of the data according to the predetermined ratio;
obtaining a weighting of a cache fragment according to the distribution result; and
storing the cache to the first storage unit and the second storage unit according to the weighting.

16. The data writing method as claimed in claim 15, wherein the first storage unit is a RAMDisk and the second storage unit is a Solid State Hybrid Drive, the steps further comprise:
calculating the predetermined ratio of the cache corresponding to the data according to a capacity of the first storage unit and a capacity of a Solid State Drive of the second storage unit.

17. The data writing method as claimed in claim 15, wherein the first storage unit is a RAMDisk.

18. The data writing method as claimed in claim 15, wherein the steps further comprise:
obtaining the weighting corresponding to the cache according to a Hybrid Hinting program and the predetermined ratio.

19. A data writing method adapted to an electronic device, the steps comprising:
reading data;
obtaining first information of a first storage unit and second information of a second storage unit;
obtaining a weighting of a cache fragment of the data;
calculating a predetermined ratio of the cache corresponding to the data according to the first information and the second information; and
determining a cache volume distributed to the first storage unit and the second storage unit according to the predetermined ratio and the weighting.

20. The data writing method as claimed in claim 19, wherein the first storage unit is a RAMDisk.

21. The data writing method as claimed in claim 19, wherein the second storage unit is a Hard Disk Drive.

22. The data writing method as claimed in claim 19, wherein the second storage unit comprises a Hard Disk Drive and a Solid State Drive.

23. The data writing method as claimed in claim 19, wherein the second storage unit is a Solid State Hybrid Drive.

24. The data writing method as claimed in claim 19, wherein the steps further comprise:
obtaining the weighting corresponding to the cache according to a Hybrid Hinting program and the predetermined ratio.

* * * * *